United States Patent
Hanaoka

(10) Patent No.: US 7,011,462 B2
(45) Date of Patent: Mar. 14, 2006

(54) PRINT VIA NETWORK

(75) Inventor: Masaaki Hanaoka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 30 days.

(21) Appl. No.: 10/482,798

(22) PCT Filed: Mar. 14, 2003

(86) PCT No.: PCT/JP03/03127

§ 371 (c)(1), (2), (4) Date: Jan. 5, 2004

(87) PCT Pub. No.: WO03/079180

PCT Pub. Date: Sep. 25, 2003

(65) Prior Publication Data

US 2004/0213612 A1 Oct. 28, 2004

(30) Foreign Application Priority Data

Mar. 15, 2002 (JP) .................................. 2002-071515

(51) Int. Cl.
B41J 11/44 (2006.01)

(52) U.S. Cl. ............................. 400/76; 400/61; 400/70; 358/1.1

(58) Field of Classification Search .................. 358/1.1; 400/70, 76, 61
See application file for complete search history.

(56) References Cited

U.S. PATENT DOCUMENTS

| | | | | |
|---|---|---|---|---|
| 5,673,373 A | * | 9/1997 | Nosaki et al. ............. | 358/1.15 |
| 5,987,228 A | | 11/1999 | Nishizawa | |
| 6,163,383 A | * | 12/2000 | Ota et al. ..................... | 358/1.1 |
| 6,202,092 B1 | | 3/2001 | Takimoto | |
| 2001/0016912 A1 | * | 8/2001 | Takahashi .................. | 713/200 |
| 2003/0005337 A1 | * | 1/2003 | Poo et al. ................... | 713/202 |
| 2003/0160997 A1 | * | 8/2003 | Kimura ..................... | 358/1.15 |
| 2004/0080777 A1 | * | 4/2004 | Smith ........................ | 358/1.14 |
| 2004/0085188 A1 | * | 5/2004 | Minemura ................. | 340/5.53 |

FOREIGN PATENT DOCUMENTS

| | | |
|---|---|---|
| EP | 856972 A2 | 11/1997 |
| EP | 0977436 A1 | 2/2000 |
| EP | 1045323 A2 | 10/2000 |
| JP | 07-081154 A | 1/1994 |
| JP | 06-183110 A | 5/1994 |
| JP | 06-004238 A | 3/1995 |
| JP | 09-258932 A | 10/1997 |
| JP | 9-293036 A | 11/1997 |
| JP | 10-161823 A | 6/1998 |
| JP | 11-154218 A | 6/1999 |
| JP | 2000-059323 A | 2/2000 |
| JP | 2000-089924 A | 3/2000 |
| JP | 2000-357067 A | 12/2000 |
| JP | 2001-16383 A | 1/2001 |
| JP | 2001075751 A * | 3/2001 |
| JP | 2001-236183 A | 8/2001 |
| JP | 2001-256010 A | 9/2001 |
| JP | 2001265739 A * | 9/2001 |
| JP | 2001-312386 A | 11/2001 |
| JP | 2002-32205 A | 1/2002 |

OTHER PUBLICATIONS

Notification of Reason For Rejection.

* cited by examiner

Primary Examiner—Charles H. Nolan, Jr.
(74) Attorney, Agent, or Firm—Sughrue Mion, PLLC

(57) ABSTRACT

A system is used where a print portal 100 that is functions at least as an intermediary server and a print station are connected on a network. The print portal 100 receives a job from a job resource 10 via the network and manages it for the respective executive authority person. When the executive authority person uses an instruction client 40 to instruct the intermediary server to output the job, the intermediary server authenticates the executive authority person by way of biometric authentication or the like, and then transfers the job to the print station 30. This enables an improper printing or mistaken printing to be avoided since the printing can be performed in response to the instruction of the person who has the true executive authority of the job.

23 Claims, 10 Drawing Sheets

| Cases | Necessity of Output Inquiry |
|---|---|
| A. Authority Person is Identical to Issuer  | Unnecessary |
| B. Authority Person is Included in Insseres  | Necessary/ Unnecessary |
| C. Authority Persons and Issueres Partly Overlap  | Necessary/ Unnecessary |
| D. Authority Person is Completely Different from Issuers  | Necessary |

PRINT VIA NETWORK

BACKGROUND OF THE INVENTION

1. Field of the Invention

This invention relates to a technique for outputting a print job via a network.

2. Description of the Related Art

In the prior art, a protocol referred to as IPP (Internet Printing Protocol) is known as a technique for printing by use of any client and any printer connected to the Internet. Since this technique uses a URI (Uniform Resource Indicator) to designate a printer as an output destination, the output destination is limited to printers whose URI are known.

The applicant proposed a technique for printing by use of any client and any printer via the Internet regardless of whether or not the URI is known (e.g. a technique disclosed in JP2001-236183A). This technique uses a print intermediary server connected to the Internet to mediate the print job and thereby prints by use of any client and any printer. The clients may include a variety of Internet-enabled devices, including a cellular phone.

The above-mentioned prior art, however, has two practical problems described bellow. The first problem relates to receiving the printed material. In outputting via the Internet, a plurality of users share the printer. Since some printed material have high confidentiality, it is required in practice to ensure that the printed material is delivered only to the true receiver even under such situation or to improve the security.

The second problem relates to simplicity of output during printing. In outputting via the Internet, as a result of the fact that the output destination can be selected flexibly, the information to be input by the user tends to be increased compared to the case of outputting to the so-called locally connected printer. Furthermore, it tends to request input of complicated password and the like in order to improve the security as described in the first problem, and therefore the output amount tends to be further increased. Such complicated output diminishes the convenience of print system and cannot be overlooked, especially during printing by use of a portable terminal such as cellular phone.

Each of the above problems is not limited to the Internet but is common to printing via a network. The objective of the invention is to avoid printing improperly or mistakenly in printing via a network. Furthermore, another objective is to simplify operations during printing.

SUMMARY OF THE INVENTION

In order to solve at least part of the above problems, the invention provides a following configuration in a print intermediary server provided on a network. This print intermediary server has a function of sending a print job received via the network to a printing apparatus connected to the network. The network may include a network such as the Internet that can be accessed by the general public or a relatively limited network such as LAN and personal computer communication.

This invention provides a job management unit, an instruction acquisition unit and a print job output unit for the print intermediary server as a first configuration. The job management unit manages the print job in associated with an output authority person who has authority to output the print job. The output authority person may be identical to or different from an issuer of the print job. In order to maintain the association with the output authority person, information specific to the output authority person such as name and user ID can be used. The instruction acquisition unit acquires from one of clients connected to the network an output instruction of print job and authentication information for authenticating a sender of the output instruction. The print job output unit, when the sender is authenticated to have the authority to output based on the authentication information, sends the print job to the printing apparatus. This enables an improper printing or mistaken printing to be avoided since the print job is performed when the true output authority person instructs to output the print job.

In the invention, the client can be an apparatus different from the printing apparatus. The client may include a variety of devices such as a computer connectable to the network, a cellular phone and a PDA. This, for example, enables an output result to be obtained after a necessary operation is previously performed in the client, thereby enabling a convenience to be enhanced.

When the client is different from the printing apparatus under a circumstance where a plurality of printing apparatuses are connected to the network, a printing apparatus to which the print job should be output may be designated via the client so that the print intermediary server sends the print job based on the designation information. Alternatively, the printing apparatus may be previously designated when the print job is issued. This enables to cause the appropriate printing apparatus desired by the user to output.

In this invention, the client may be configured in an integral fashion with the printing apparatus. This enables the user to instruct to output without preparing another client. Furthermore, if the print intermediary server is to send the print job to the print apparatus whereby the output instruction is performed, the designation of output destination may be omitted. Of course, the designation of output destination is not necessarily limited to the printing apparatus whereby the output instruction is performed, but another printing apparatus may be available.

In this invention, the authentication can be performed in a variety of aspects.

For example, a first aspect may include determining whether or not particular information previously associated with the output authority is identical to input authentication information. For example, this aspect is actualized by providing a database in which user IDs and associated passwords are stored and determining whether or not a combination of user ID and password input as the authentication information is identical to a combination of those of the output authority person.

A second aspect may include determining whether or not a user identified based on the authentication information is identical to the output authority person. For example, this aspect is actualized by storing user IDs and associated passwords, identifying a user ID based on a password input as the authentication information and determining whether or not this user ID corresponds to the output authority person.

In this invention, it is preferable to switch a plurality of authentication methods in response to at least one of details of the print job and an issuer of the print job. For example, it is possible to apply a simplified authentication method to a print job of relatively low confidentiality or omit the authentication and to apply a highly accurate authentication method to a print job of high confidentiality. The print job of low confidentiality includes, for example, outputting an advertisement or a Web site. The print job of high confidentiality includes, for example, outputting securities, personal information, and an invoice. Since necessary cost and time usually differ depending on authentication methods, switching the authentication methods enables excessive cost and time to be reduced while ensuring confidentiality required by each print job.

When there are a plurality of print jobs corresponding to the output authority person, the authentication in this invention may be performed at once for all the print jobs, or may be performed individually for each print job to be output. For example, the latter aspect is actualized by inputting the authentication information after specifying the print job to be output. This enables a proper authentication to be performed in response to details or the like of the specified print job.

The authentication in this invention is not limited to one using a user ID and a password but may include, for example, a biometric authentication. The biometric authentication uses bio-information substantially specific to a user, for example; a fingerprint, a shape of face or palm, an iris of eye, handwriting, and a voiceprint. The biometric authentication can enable a high convenient and high accurate authentication since the user need not memorize his password and the like.

The biometric authentication is useful especially in the case where the client and the printing apparatus are integrated. One advantage of this invention is to be capable of freely using a plurality of printing apparatuses beyond the range of conventional local connection or LAN connection. In such situation, if a device such as a cellular phone, which is different from the printing apparatus and substantially specific to the user, is used as the client, the user can store necessary authentication information, such as his user ID and password, in the client. On the other hand, if the client and the user ID are integrated, the user cannot store his authentication information in each printing apparatus and therefore must input the authentication information for every execution of print job. As described above, the biometric authentication enables a high accurate authentication without obliging the user to memorize his password and the like, and therefore is useful especially if the authentication information must be input for every execution of print job.

In this invention, the authentication information to be input via the client may be switched in response to a timing of the output instruction. This enables the accuracy of authentication to be further enhanced. This aspect can be also applied to the authentication using a password and the like, and is useful especially if the biometric authentication is used. For example, in the fingerprint authentication, the print intermediary server may specify a finger used for the authentication such as "forefinger" and "middle finger" for the client. It is required for the user only to use the specified finger, and therefore the high accuracy of authentication is achieved without excessive burdens on the user.

In this invention, the authentication may be performed within the print intermediary server or may be performed by use of an external authentication agency provided outside the print intermediary server. In this case, the print intermediary server may send the information of the output authority person to the authentication agency, receive a result of determination of its truth or not from the authentication agency, and then output the print job. Alternatively, the print intermediary server may receive credible user information from the authentication agency, determine by itself whether or not it corresponds to the output authority person, and then output the print job. The authentication information may be directly sent from the client to the authentication agency or may be sent via the print intermediary server to the authentication agency.

This invention provides a job receiving unit and an output control unit for the print intermediary server as a second configuration. The job receiving unit receives the print job in associated with the executive authority person of output of the print job and the issuer of the print job. The output control unit switches the executive procedure and then outputs the print job based on at least one of details of the print job and an identity of the executive authority person and the issuer. In this case, the executive authority person includes a receiver of the printed material, an owner of the printing apparatus and the like. The second configuration, for example, enables a variety of operations to be simplified based on details or the like of the print job, thereby enabling a convenience in printing via the network to be enhanced.

In the second configuration, for example, when the executive authority persons and the issuers at least partly overlap, the print job may be allowed to be sent without inquiring about whether or not to send the print job with the executive authority persons. For example, the print job for a plurality of persons can have a plurality of executive authority persons. Alternatively, when an advertisement or the like is inserted into the originally specified content to generate the ultimate print job, there can be a plurality of issuers of the print job including an issuer of the advertisement. When the executive authority persons and the issuers partly overlap, including such cases where the both include a plurality of persons, there can be no harm in determining that the print job is addressed by the issuer to himself. Therefore, in such cases, the print job can be sent without the inquiry of whether or not to send that is asked by use of a message such as "Is it OK to print?" and thereby enabling the operations to be simplified.

In the above aspect, the inquiry of whether or not to send the print job is not necessarily omitted when the executive authority persons and the issuers at least partly overlap. A further additional condition may be included to omit the inquiry. For example, the inquiry may be omitted when the executive authority person and the issuer are identical while the inquiry may be performed otherwise.

In the second configuration, for example, when a person other than the executive authority persons is included in the issuers, the executive authority person may be inquired about whether or not to send the print job and then the print job may be allowed to be sent based on the result. When the issuer other than the executive authority persons is included, inquiring about whether or not to send prior to the sending enables the printing undesired by the executive authority person to be avoided.

In this aspect, the inquiry of whether or not to send is not necessarily performed when the person other than the executive authority persons is included in the issuers. A further additional condition may be included to omit the inquiry. For example, under the above-mentioned condition, the inquiry may be omitted when the executive authority person is included in the issuers while the inquiry may be performed otherwise.

In the second configuration, the inquiry of whether or not to send may be switched depending on details of the print job. For example, the inquiry may performed for print jobs that require relatively high reliability of delivery and print jobs of high confidentiality such as certificates and securities while the inquiry of whether or not to output may be omitted for print jobs of relatively low confidentiality such as advertisements. Furthermore, when the fee is charged for the printing, the inquiry of whether or not to output may be performed for the print job for which a predetermined fee or above is charged such as the print job including a color photo while the inquiry may be omitted when the fee is below the predetermined fee.

This invention is not limited to the aspects as the print intermediary servers described above and can be configured in a variety of aspects. For example, this invention may be configured in aspects such as an intermediary method for using the print intermediary server to mediate the print job, a computer program for enabling the print intermediary server to mediate and a computer-readable storage medium with such program stored therein.

Such storage medium may include a variety of computer-readable media such as flexible disk, CD-ROM, DVD, magneto-optics disc, IC card, ROM cartridge, punched card, print with barcodes or other codes printed thereon, internal storage device (memory such as RAM and ROM), and external storage device of the computer.

DESCRIPTION OF THE PREFERRED EMBODIMENTS

The details of the invention are described below with reference to embodiments of a system for printing via a network.

Figure 1:
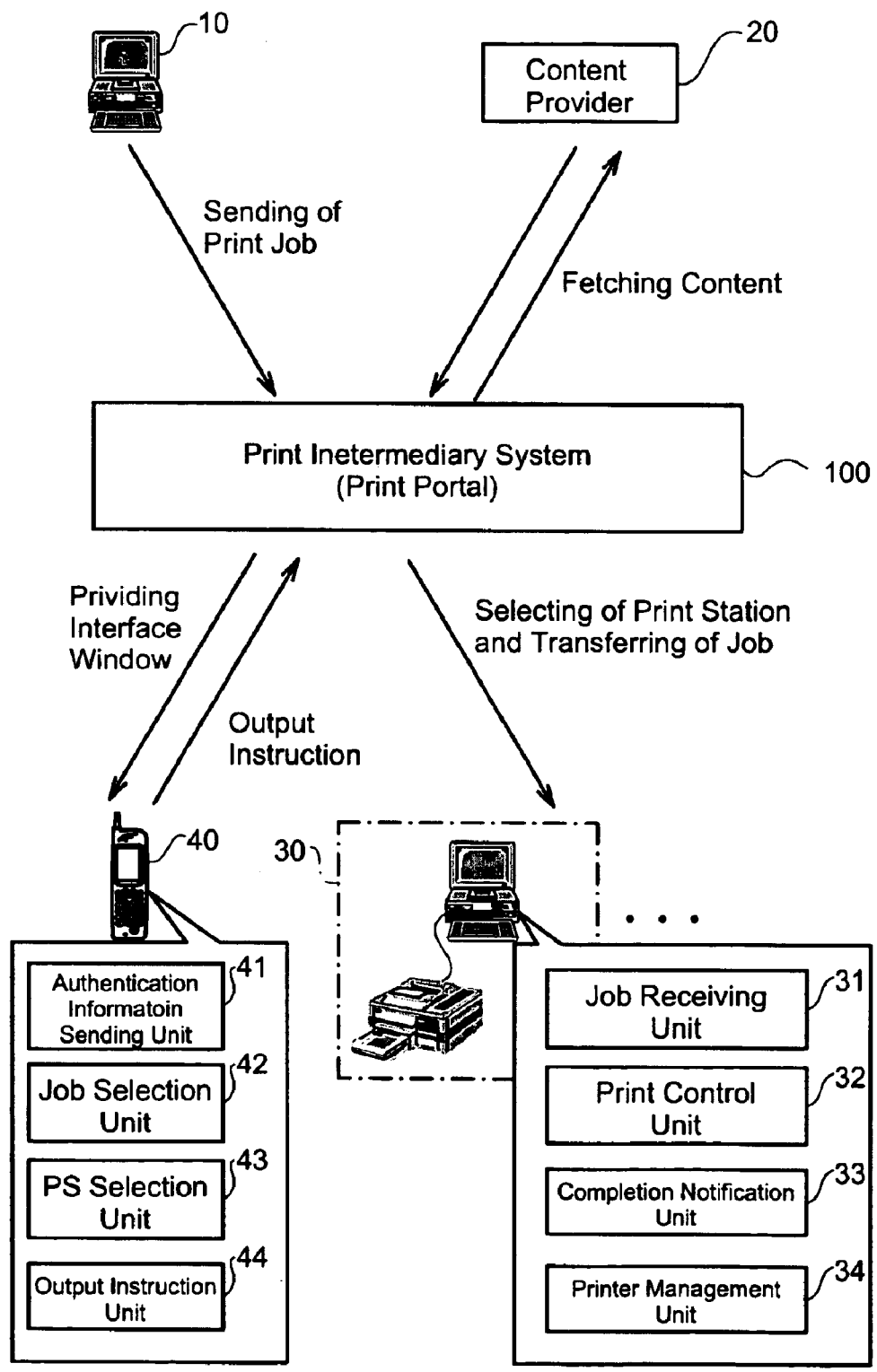
FIG. 1 is a schematic that shows a general configuration of a print system as a first embodiment.

A. First Embodiment
A1. General Description of System
A2. Output Process
A3. Personal Authentication Process
B. Second Embodiment
B1. General Description of System
B2. Output Process
C. Third Embodiment
D. Fourth Embodiment
E. Modifications
A. First Embodiment
A1. General Description of System FIG. 1 is a schematic that shows a general configuration of a print system as the first embodiment. This system includes clients each connected to a print intermediary system 100 via a network, and enables printing via the network through the following procedure. First, the print intermediary system 100 (hereinafter referred to as print portal) receives and manages a print job sent from a print job source 10. Next, an instruction client 40 that consists of a cellular phone sends a print instruction, and then the print portal 100 sends the print job to a print station 30 according to the instruction. The print station 30 receives this print job and then prints.

Although the Internet is used as the network in this embodiment, a limited network such as LAN or so-called personal computer communication may be used. Here shows an example case where the Internet is used for sake of convenience of explanation.

The print job source 10 consists of a general-purpose computer or the like that has a function of accessing the network. Objects to be printed include, for example, images, documents and e-mails created by a variety of application programs in the print job source 10 and Web pages provided by a variety of content providers 20 present on the Internet. When the Web page is printed, the content itself created in HTML or the URL (Uniform Resource Locator) at which the Web page is located may be sent as the print job. In the latter case, for example, the print portal 100 fetches the content based on the URL and then sends it to the print station to perform printing.

The instruction client 40 is a device for performing an output instruction on the print job managed by the print portal 100. In this embodiment, it is the cellular phone that has a function of accessing the Internet but is not limited to this, and thus a terminal such as a personal computer or PDA is available.

Functional blocks of the instruction client 40 are also shown in FIG. 1. In this embodiment, these functional blocks consist of software installed in the instruction client 40. Of course, these functional blocks may be configured as hardware.

An authentication information sending unit 41 has a function of sending authentication information of a user (hereinafter referred to as instructor) who instructs the output of the print job. In this embodiment, a "voiceprint" is used as the authentication information. The voiceprint is one of authentication information used for biometric authentication. For example, frequency components of voice can be used as the authentication information to perform the authentication. The authentication information sending unit 41 acquires the frequency components of the user's voice based on the voice input from the cellular phone and then sends them as the authentication information. The authentication information is not necessarily limited to the voiceprint but may include a variety of information such as a password.

A job selection unit 42 specifies the print job to be printed out of the print jobs managed by the print portal 100. A PS selection unit 43 designates the print station to which the print job should be sent. An output instruction unit 44 instructs to start sending the print job. An interface window necessary for these instructions is displayed on a display of the instruction client 40. It is preferably convenient that the window is provided by the print portal and browsed through a browser provided for the instruction client 40.

The print station 30 consists of a computer connectable to the network and a printer that is locally connected to the computer. It may consist of only a printer connectable to the network. The print station 30 is provided with functional blocks for enabling this system to print. The functional blocks are also shown in the figure. In this embodiment, these functional blocks are configured as software in the computer. In the case where the print station consists of only a printer, each of the functional blocks is configured in the printer. Of course, these functional blocks may be configured as hardware.

A job receiving unit 31 has a function of receiving the print job from the print portal 100. A print control unit 32 has a function of controlling the printer to print based on the received print job. A completion notification unit 33 notifies the print portal 100 the completion of printing. It preferably notifies in the case of abnormal termination as well as normal completion of printing. A printer management unit 34 has a function of monitoring whether or not the printer can print normally. If the printer cannot print normally, for example, ink or toner of the printer is insufficient, the printer is off, or papers are insufficient, it stops the execution of printing. In such a case, it may inform outside accordingly. The way of informing may be appropriately selected out of the ways, for example, display on the computer display, audio output, and communication to the print portal 100. Among the functional blocks provided for the print station, the completion notification unit 33 and the printer management unit 34 may be omitted.

Figure 2:
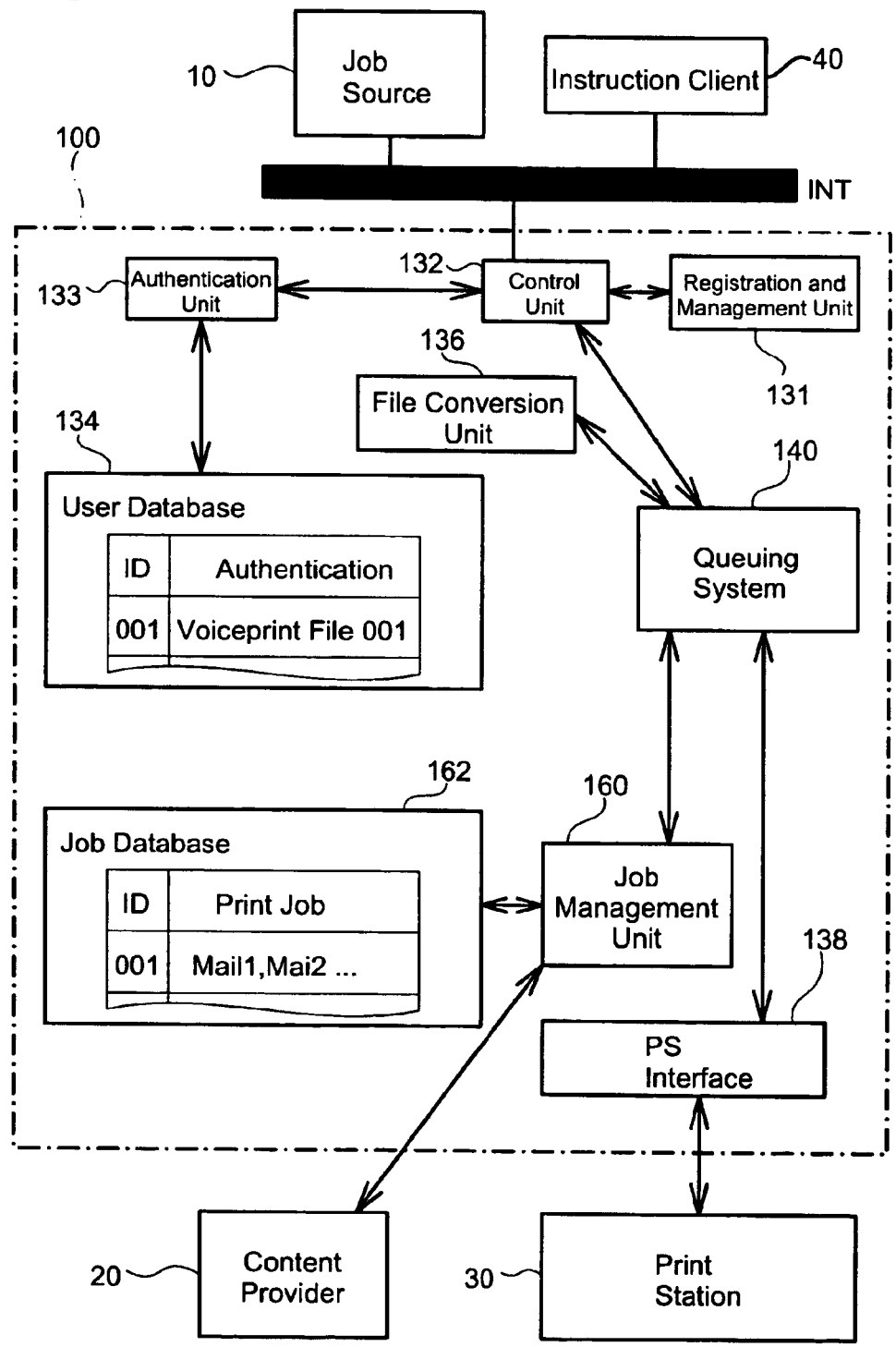
FIG. 2 is a schematic that shows an internal structure of a print portal 100.

FIG. 2 is a schematic that shows an internal structure of the print portal 100. In the print portal 100, a variety of functional blocks shown in FIG. 2 are configured as software. These functional blocks may be configured as hardware. Although this embodiment exemplifies the case where each of the functional blocks is configured in a single server for sake of convenience of explanation, they may be configured as a distributed processing system that uses a plurality of servers.

A control unit 132 controls the operation of each functional block of the print portal 100, the communication with the outside via the Internet INT and the other operations. The controls include the registration and management of the user, the output instruction of the print job, the search of the printer as output destination. Furthermore, the control unit 132 provides the interface window for the print portal 100 interacting with the outside.

A registration management unit 131 performs the registration and management of the user, the content provider 20 and the print station 30 that use the print portal 100. The registration and management unit 131 provides a function of generating an interface window for this process, a function of storing and changing data related to the registration in a predetermined database.

A queuing system 140 relays the operation of each functional block. In this embodiment, each functional block is constructed as so-called object-oriented software. Each functional block refers to a message registered in the queuing system 140 to detect the presence of the print job to be processed, and then performs its own process. When the processes are completed, a message representing the completion of the processes is registered in the queuing system 140. In this way, each functional block uses the queuing system 140 as a relay system to perform its own process, and thereby the print portal 100 achieves a series of processes from receiving to outputting of the print job. The queues for achieving these processes include a print job registration queue, a content acquisition queue, a file conversion queue, a print job sending queue and the like.

A job management unit 160 has mainly two functions. The first function is of accessing the content provider to acquire the content that the user specifies as a print object in the case where the content to be printed is specified by the URL or the like. The job management unit 160 refers to the content acquisition queue included in the queuing system 140 and then performs the above-mentioned operation according to the message accumulated therein.

The second function of the job management unit 160 is of managing the print job until the output instruction is made. When the print portal 100 receives the print job, it does not immediately send it to the print station 30 but manages the print job until the output instruction is made subsequently. When the job management unit 160 acquires from the queuing system 140 the print job registration queue generated by the control unit 132 when receiving the print job, it registers the print job in a job database 162 according to the print job registration queue. FIG. 2 exemplifies a part of the job database 162. As shown in FIG. 2, the print jobs are managed on each user having the output authority in associated with the respective user ID. Although the output destination of the print job can be designated by the output instruction, it may be presettable.

The job management unit 160 has a function of presenting a list of the print jobs managed in the job database 162 as well as the function of registering the print job as described above. Furthermore, when the output instruction is made, it performs a pre-process for outputting the print job corresponding to the instruction to the print station 30, and thus it has a function of generating the file conversion queue and then registering it in the queuing system 140.

An authentication unit 133 authenticates whether or not the user who has made the output instruction is a true executive authority person of the print job. In this embodiment, the authentication is performed that uses a voiceprint of biometric authentication technique. In the print portal 100, the voiceprints as a user database 134 are previously registered in associated with the user IDs of the users. Although the user database 134 also includes the other user-specific information, for example, use authority of the print station 30, access authority to the content provider 20, accounting methods, they are omitted in FIG. 2. The authentication unit 133 refers to this user database 134 based on a voiceprint file input from the instruction client 40 to authenticate whether or not the user has the true executive authority.

A file conversion unit 136 has a function of converting the content into PDF format. Since the PDF is a general-purpose format, it is advantageous to convert into such format and then mediate the print data in that the print data can be readily output to a variety of printers. Furthermore, there is an advantage of being able to relatively faithfully keep a layout of the printed material. In addition, there is an advantage of being able to cover a wide range of contents as print objects since it is possible to convert from substantially all print data such as a document and an image. The general-purpose format may include a page description language such as Postscript (registered trademark).

The file conversion unit 136 converts the file according to the messages accumulated in the file conversion queue of the queuing system 140. When the file conversion is completed, it registers a sending message of the print job in a print job send queue of the queuing system 140. Although the file conversion unit 136 is configured within the print portal 100 in this embodiment, it may be an external function provided by another server.

Although the output instruction of the print job is made and then the file conversion is performed in this embodiment, the file may be converted at the stage where the print job has been received and then be registered in the job database 162. Alternatively, the file conversions of the print jobs registered in the user database may be sequentially performed independent of the receiving and output instructions of the print job when the server has relatively less load.

A PS interface 138 has a function of sending the print job to the print station 30. The PS interface 138 sends the print job to the designated print station 30 according to the message accumulated in the print job send queue of the queuing system 140. Such sending is performed according to a variety of protocols set by the print station 30 such as HTTP (Hypertext Transport Protocol).

A2. Output Process

Figure 3:
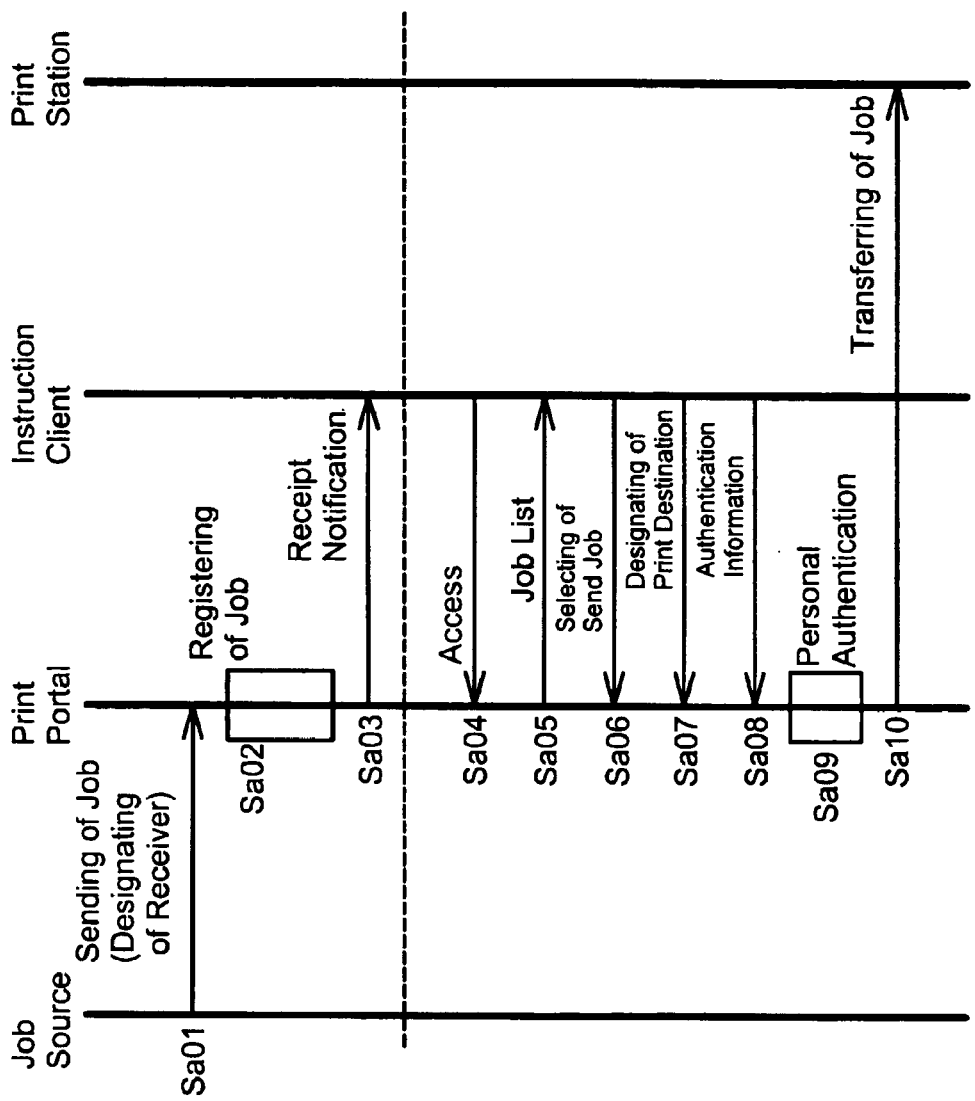
FIG. 3 is a flowchart of an output process in the embodiment.

FIG. 3 is a flowchart of the output process in the embodiment. FIG. 3 shows the processes that are performed by the print job source 10, the print portal 100, the instruction client 40 and the print station 30 respectively. The output in this embodiment is divided into two major phases of a sending phase and an output phase of the print job. In FIG. 3, an upper part above a broken line corresponds to the sending phase of the print job while a lower part below the broken line corresponds to the output phase.

In the sending phase, the print job is sent from the print job source 10 to the print portal 100 (step Sa01). At this time, the print job includes the designation of receiver as the executive authority person of the print job output. The receiver is identified in the form of a user ID or the like. The sender and the receiver may be identical or different.

The print portal 100 registers the received print job in the job database 162 (step Sa02). In addition to this, the print portal 100 informs the receiver of receiving the print job (step Sa03). In this embodiment, this informing is performed through an e-mail. An e-mail address is registered in the user database 134 (shown in FIG. 2). Due to informing through the e-mail, it is advantageous for the receiver to be able to immediately know that the printing has been received. Meanwhile, the informing of receiving (step Sa03) may be performed in a variety of ways such as a facsimile as well as the e-mail. The informing of receiving may be omitted.

The output phase includes the following steps. The receiver uses the instruction client 40 to access the Web page provided by the print portal 100 (step Sa04). At this time, the receiver sends his own user ID to the print portal 100.

The print portal 100 presents to the instruction client 40 the list of the print jobs that are managed in associated with this user ID (step Sa05). The receiver selects the print job that he desires to print (hereinafter referred to as send job) out of the list (step Sa06), and also designates the print destination (step Sa07). In order to designate the print destination, the address information of the print station 30 or the name of the shop or the like at which the print station 30 is located may be used.

The print portal 100 requests the receiver to input the authentication information and then inputs a voiceprint file as the authentication information (step Sa08). The print portal 100 performs the personal authentication whether or not the user is a true executive authority person based on this authentication information (step Sa09), and if the user is authenticated, then sends the specified print job to the print station (step Sa10). The user may be inquired prior to the sending about whether or not to output the print job, or the print job may be sent without such inquiry.

In this embodiment, the authentication is not performed as a so-called login procedure when the user accesses (step Sa04), but the authentication is performed after the send job has been selected, and therefore there is a significance that the authentication whether or not to output is performed for each send job. As illustrated in FIG. 3, it is applicable to input only the user ID and omit the authentication information in accessing, or it is also applicable to login with a password or the like in accessing and further perform the authentication for each send job. Although the authentication is performed for each send job in this embodiment, the authentication with voiceprint may be performed in accessing to omit the authentication for each send job. Furthermore, when plural print jobs are selected as the send jobs, these jobs may be authenticated all at once or individually.

The print station performs this print job to complete the printing. Meanwhile, when the execution of the print job is completed, the print station may send the information of completion to the instruction client 40 via the print portal 100. This enables the receiver to know the completion of printing even if he is away from the print station 30. In addition, the information of completion may be sent to the print job source.

Figure 4:
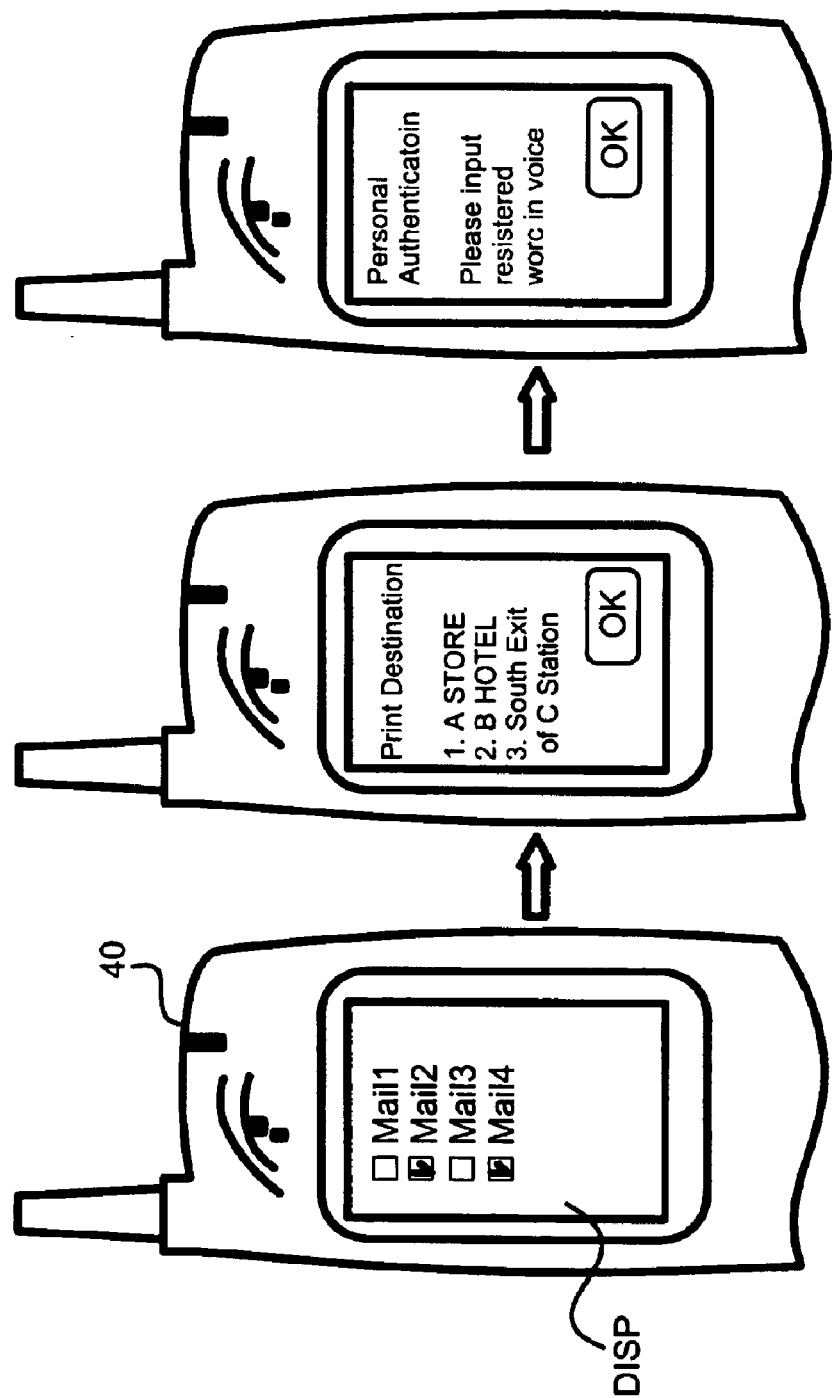
FIG. 4 is a schematic that shows an example of an interface window whereby an output instruction is performed.

FIG. 4 is a schematic that shows an example of an interface window whereby the output instruction is performed. There are shown contents displayed on a display DISP of the instruction client 40. The display on the left hand shows the list of the print jobs. There is shown the case where the four print jobs of Mail 1 to Mail 4 have been received. The receiver has checked the check boxes to select Mail 2 and Mail 4 as the send jobs. Although FIG. 4 exemplifies the case where only the titles of the print jobs are listed, the related information on each print job may be also presented. Such related information includes a sender, receiving time of print job, a paper size, a number of papers, classification of color and monochrome, and the like.

The display on the center is used to designate the print destination. There is illustrated the case where it is selected from names of store, hotel and the like. After "A store" is selected, branch store names or the like of the store may be displayed to enable a step-by-step detailed selection.

The display on the right hand represents an example of a request window for the authentication information. In this embodiment, a voice input of a "registered word" is requested since the voiceprint is used as the authentication information. The registered word means a word that can reproduce the information corresponding to the voiceprint file registered in the user database 134. For example, it can be identical to a word that is used for the voiceprint registration to the user database 134.

A3. Personal Authentication Process

Figure 5:
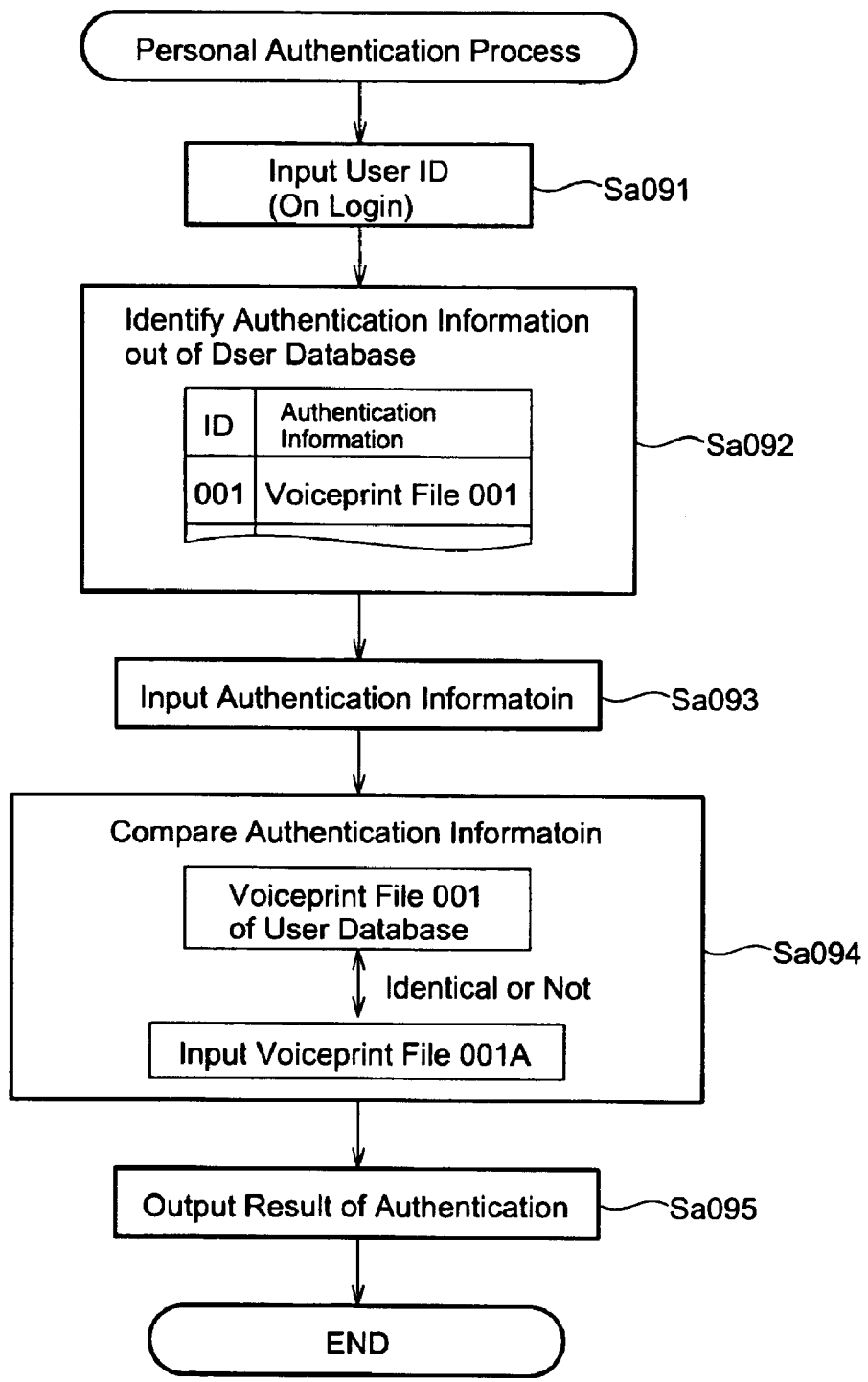
FIG. 5 is a flowchart of a personal authentication process.

FIG. 5 is a flowchart of the personal authentication process. This is a process which a CPU of the print portal 100 performs and which represents details of the processes of step Sa08 and Sa09 in the sequence of FIG. 3.

When this process is initiated, the CPU inputs the user ID (step Sa091) and then identifies the authentication information corresponding to the user ID out of the user database 134 (step Sa092). The information that has been input for login (step Sa04 of FIG. 3) is used as the user ID. In FIG. 5, there is exemplified the case where a "voiceprint file 001" is stored as the authentication information corresponding to the user ID "001" in the user database 134.

Next, the CPU inputs the authentication information from the instruction client 40 (step Sa093), compares it to the authentication information identified in step Sa092 (step Sa094) and then outputs a result of the comparison (step Sa095). The user is authenticated as the true output authority person if the both authentication information are identical while he is regarded as unauthorized if they are not identical. The result can be output in a variety of ways. For example, it is applicable to register the print job send queue in the queuing system 140 if the user is the true output authority person.

The print system of the first embodiment described above enables the print job to be sent after the authentication of the executive authority person of the print job is performed. Therefore, it is possible to avoid the improper execution and mistaken execution of the print job. In particular, it is possible to authenticate with high accuracy since the biometric authentication is used.

B. Second Embodiment

B1. General Description of System

The first embodiment exemplifies the case where the instruction client 40 for instructing the output and the print station 30 are different. On the contrary, the second embodiment exemplifies the case where the print station also functions as the instruction client.

Figure 6:
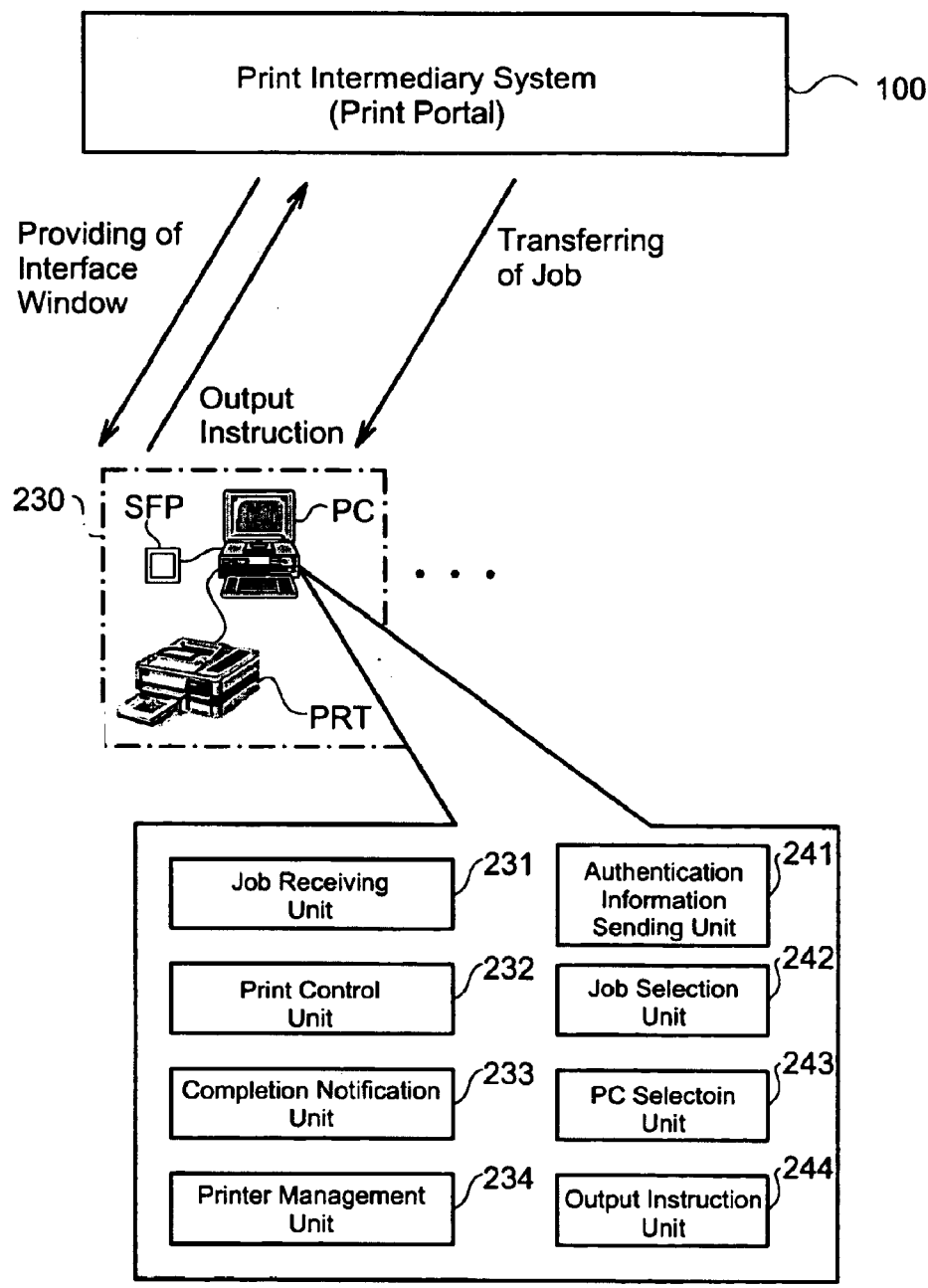
FIG. 6 is a schematic that shows a configuration of a print system in a second embodiment.

FIG. 6 is a schematic that shows a configuration of a print system in the second embodiment. The print job source 10 and the content provider 20 are not shown in FIG. 6. In the second embodiment, the print station 230 performs the output instruction to the print portal 100. In response to this instruction, the print job is sent from the print portal 100 to the print station 230 and thereby the printing is performed.

The print station 230 is similar to that of the first embodiment in that it consists of the general-purpose computer PC and the printer PRT. In the second embodiment, a fingerprint is used to authenticate the user. A sensor SFP for obtaining the fingerprint is connected to the computer PC. The print station 230 may consist of only a printer that has a function of accessing the network.

Functional blocks provided for the print station 230 are also shown in FIG. 6. A job receiving unit 231, a print control unit 232, a completion notification unit 233 and a printer management unit 234 are identical to the functional blocks of the first embodiment.

In the second embodiment, the print station 230 is provided with functional blocks for achieving the output instruction as well as the functional blocks for performing the printing. Although an authentication information sending unit 241, a job selection unit 242, a PS selection unit 243 and an output instruction unit 244 are generally similar to the functional blocks included in the instruction client 40 of the first embodiment, their functions differ as below.

First, the PS selection unit 243 sends to the print portal 100 its own address information and the like as the information of the print station that should be an output destination. This enables the receiver who instructs the output through the print station 230 to cause the print job to be performed without selecting the output destination. Of course, the function of selecting another print station as output destination may be retained in a similar way to the first embodiment.

The authentication information sending unit 241 uses the sensor SFP to obtain a fingerprint pattern which is one of biometric authentication and then sends it to the print portal 100. The fingerprint pattern can be generated in a variety of ways. For example, a technique is known that generates the fingerprint specific pattern with relatively less amount of data based on characteristic points such as end points and branch points included in the fingerprint. Once again, in the second embodiment, the authentication method is not limited to the fingerprint and, for example, the password may be used.

B2. Output Process

Figure 7:
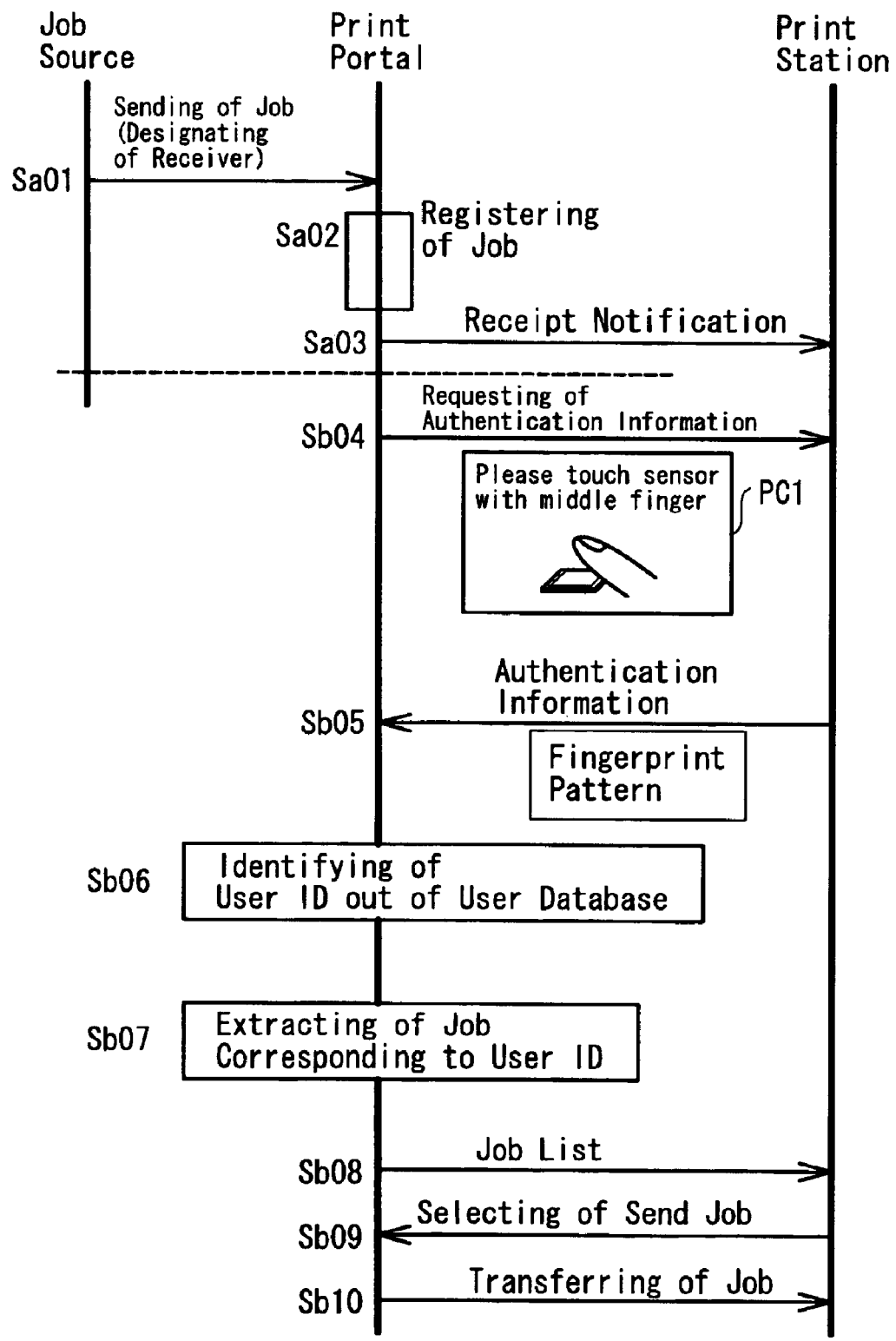
FIG. 7 is a flowchart of an output process in the second embodiment.

FIG. 7 is a flowchart of an output process in the second embodiment. The phase for sending the print job (steps Sa01 through Sa03) is similar to that of the first embodiment.

The print station 230 displays a window for requesting the authentication information and waits for an operation of the user (step Sb04). In FIG. 7, there is exemplified an example of the window PC1 for requesting the authentication information. As shown in FIG. 7, a message such as "Please touch sensor with middle finger" is displayed in the waiting window.

The finger used for the authentication may be constant, but it is preferably changed at a predetermined timing. For example, it is desired that the finger used for the authentication is randomly changed whenever the execution of print job is instructed. This enables an abuse of fingerprint pattern to be inhibited even if the fingerprint pattern is obtained as electronic data by a third person and thus an accuracy of authentication to be further improved.

When the user touches the sensor according to the instruction, the print station 230 sends a fingerprint pattern file as the authentication information to the print portal 100 (step Sb05). The print portal 100 performs the authentication process described below based on the authentication information.

First, the print portal 100 refers to the user database 134 to identify the user ID corresponding to the input fingerprint pattern (step Sb06). Next, it extracts the print job corresponding to this user ID (step Sb07). These steps extract the print jobs whose true executive authority person is the user who has performed the operation.

When sending the authentication information (step Sb05), the address information of the print station 230 is also sent to the print portal 100. The print portal 100 presents to the print station 230 a list of the print jobs that have been extracted in step Sb07 (step Sb08). When the user selects the send job out of this list (step Sb09), the print portal 100 sends it to the print station 230 (step Sb10).

The print system of the second embodiment described above as well as the first embodiment enables the printing to be performed after the authentication of the executive authority is performed. Furthermore, the second embodiment enables the output destination to be more simply designated and thus a convenience to be enhanced since the print station itself is the output destination.

C. Third Embodiment

The first and second embodiments exemplify the case where the constant authentication method is applied to each print job. The authentication method may be switched depending on the print job. Such case is exemplified as a third embodiment. Hereinafter, although it is described according to the configuration of the first embodiment, it is also applicable to the configuration of the second embodiment.

Figure 8:
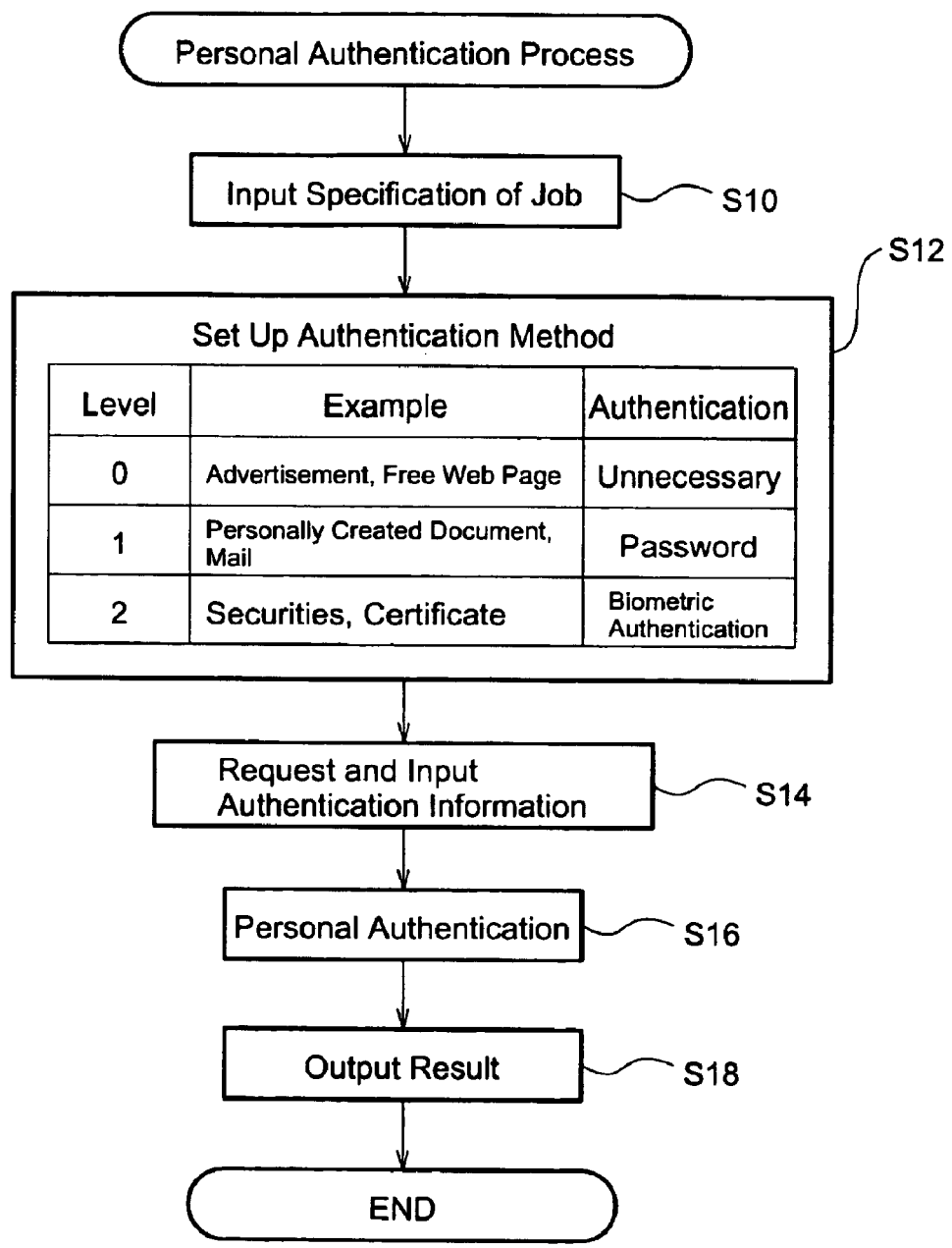
FIG. 8 is a flowchart that shows a personal authentication process as a third embodiment.

FIG. 8 is a flowchart that shows a personal authentication process as the third embodiment. The process is performed instead of the process of the first embodiment (FIG. 5) in steps Sa08 and Sa09 during the execution of the printing (FIG. 3).

When this process is initiated, the CPU inputs the specification of the job (step S10) and then sets up the authentication method (step S12). In FIG. 8, there is exemplified how to set up the authentication method. In the third embodiment, the print jobs are classified into three levels depending on the need or not for the authentication method. In the order of levels 0, 1, 2, more accurate authentication is required.

The level 0 represents the print job that does not require the authentication. The print jobs in level 0, for example, include advertisements and Web pages that are available at no charge. Because these jobs have low confidentiality and therefore there is less adverse effect even if they are printed improperly or mistakenly. The level 1 represents the print job to which the password authentication is applied. The print jobs in level 1 include personally created documents, e-mails and the like. Because these print jobs are confidential and therefore require the avoidance of improper printing. The level 2 represents the print job that requires the biometric authentication. Securities, a variety of certificates, usage details of credit card and the like are included. Because these jobs require high confidentiality and reliability of delivery and therefore the advanced authentication such as biometric authentication is required.

These levels, for example, may be preset by the sender in sending the print job, or may be set by the print portal 100 after analyzing details of the print job. For example, if the URL of free Web page is specified in sending the print job, its level can be set to level 0. If the sender sends a general document file or the like as the print job, its level can be set to level 1. The print job from a previously registered sender such as an administrative institution and a credit-card company may be determined to have high confidentiality and thus set to level 2. In this manner, the authentication method may be switched depending on the sender as well as details of the print job in this embodiment.

Next, according to the set-up authentication method, the CPU requests the authentication information to the instruction client 40 and inputs it (step S14), performs the personal authentication (step S16), and outputs the result (step S18). In the case of level 0, these steps are substantially omitted. The password is required to be input in the case of level 1 while the bio-information such as a voiceprint and a fingerprint is required in the case level 2.

The authentication process of the third embodiment switches the authentication method depending on the print job, thereby enabling a convenience of the print system to be enhanced. For example, for print jobs of low confidentiality such as advertisements and free Web pages, the authentication can be omitted to immediately print with less operations. On the other hand, for print jobs that require the authentication of high confidentiality, the improper printing or mistaken printing can be avoided.

The correspondence between the print jobs and the authentication methods shown in FIG. 8 is only an example, and therefore can be configured in any other way. The authentication methods are not limited to the exemplified three levels but may be switched among more levels or between two levels of presence/absence of authentication.

Although the third embodiment is described according to the authentication in the configuration of the first embodiment (FIG. 3) for sake of convenience of explanation, it is also applicable to the configuration of the second embodiment. In the output process of the second embodiment (FIG. 7), the user may initially select the authentication method out of a menu since the authentication is performed prior to specifying the send job (steps Sb04 and Sb05). In this case, it is required only to perform the extraction of job (step Sb07 in FIG. 7) within a range corresponding to a level selected by the user. For example, it is required only to extract the print jobs corresponding to level 0 when the user selects level 0 while it is required only to extract the print jobs corresponding to level 0 and level 1 when the user selects level 1.

D. Fourth Embodiment

In the above embodiments, the description is based on the case where the constant process is performed when sending the job to the print station. It may be accordingly switched whether or not the user is inquired prior to the sending about whether or not to output the print job. The process in such case is exemplified as a fourth embodiment.

Figure 9:
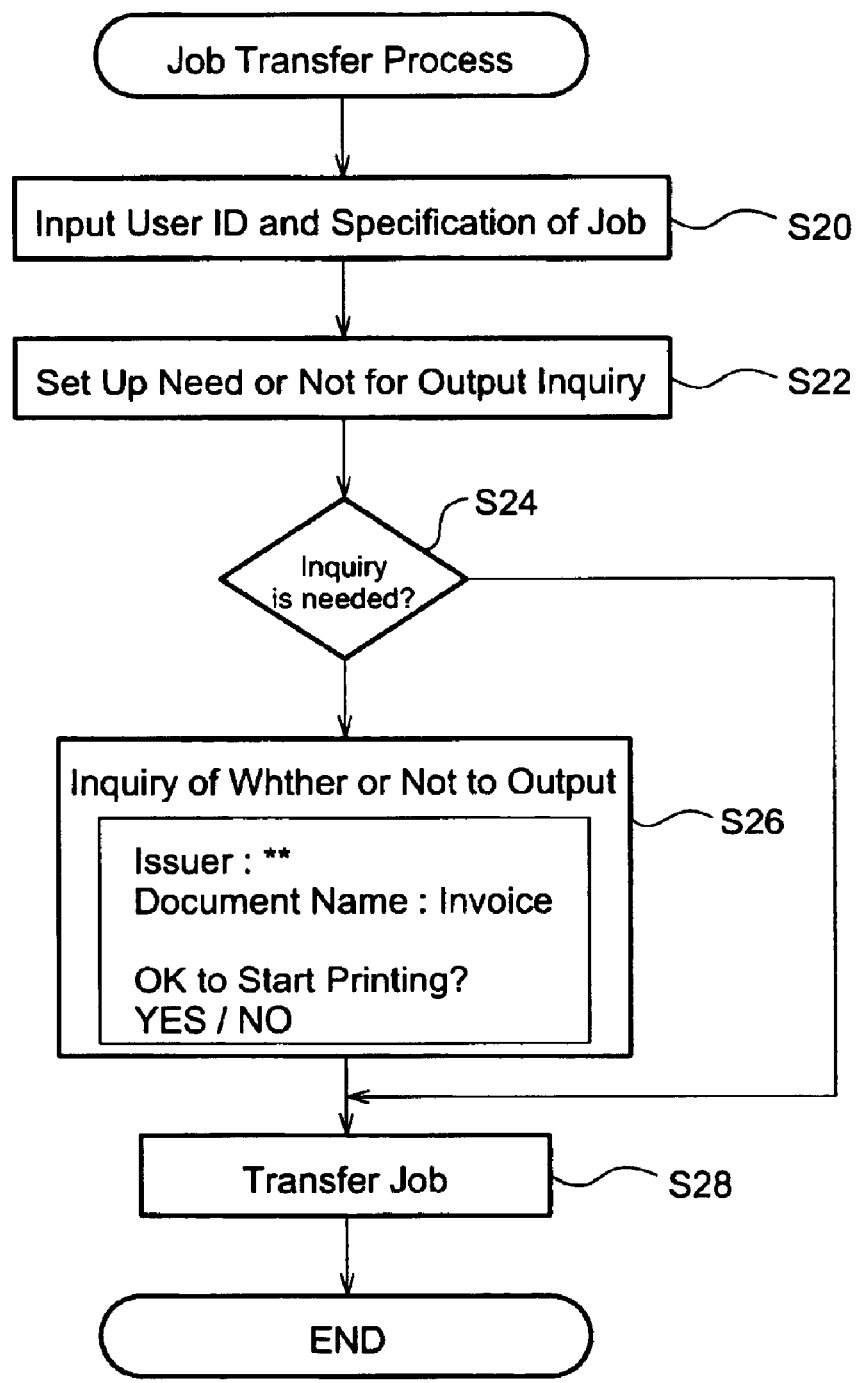
FIG. 9 is a flowchart of a job transfer process as a fourth embodiment.

FIG. 9 is a flowchart of a job transfer process as the fourth embodiment. It is a process performed in the job transfers of the first and second embodiments (step Sa10 of FIG. 3 and step Sb10 of FIG. 7). In this process, the CPU inputs the user ID and the specification of the send job (step S20) and then sets the need or not for the inquiry of output based on this (step S22). This setting method is described later.

For the print job that is determined to require the inquiry of output (step S24), the CPU inquires about whether or not to output (step S26), and then transfers the job (step S28). For the print job that is determined not to require the inquiry (step S24), this inquiry is omitted. In FIG. 9, there is exemplified an interface for the inquiry. Where an issuer, a document name and the like of the print job are displayed and the inquiry is made about whether or not the printing may be started. The displayed details can be selected accordingly.

Figure 10:
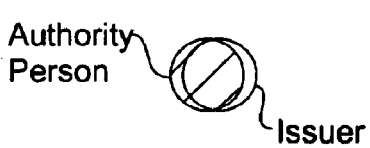
FIG. 10 is a schematic that shows how to set up the need or not for the inquiry of output.
Figure 10:
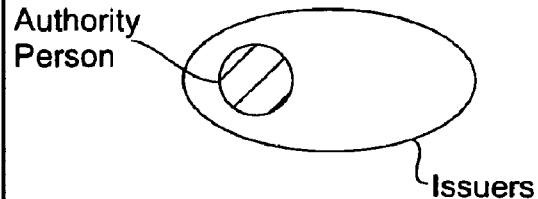
Figure 10:
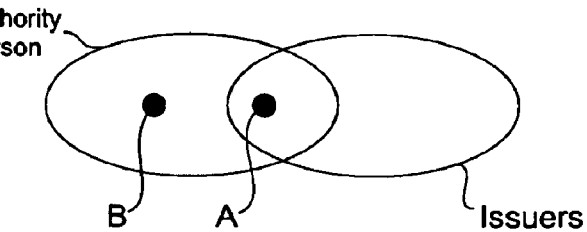
Figure 10:
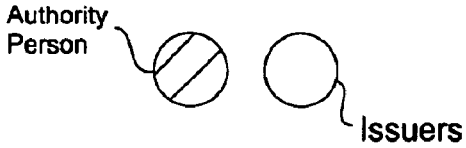

FIG. 10 is a schematic that shows how to set up the need or not for the inquiry of output. In this embodiment, the need or not for the inquiry of output is set up based on an identity of the issuer and the output authority person of the print job.

In a case A where "the authority person and the issuer are identical," it is preferable to set up the inquiry of output as unneeded. This corresponds to the case where the user has sent the print job to himself. In such case, the printing may be performed without the inquiry of output since the executive authority person knows the details of the print job as a matter of course.

In a case D where "the authority person and the issuer are completely different," it is preferable to require the inquiry of output. Because the print job can include details unknown by the executive authority person. In particular, the inquiry of output is substantially required if a fee is charged on the executive authority person for the printing.

In a case B where "the authority person is included in the issuers," it is possible to optionally set up the inquiry of output as either of needed/unneeded. The case B includes, for example, a case where one print job consists of a document sent by the user to himself and an accompanying information such as an advertisement attached to the document. The two of the user and the advertisement provider are issuers, and the executive authority person is included therein. In this case, the inquiry of output may be omitted from the viewpoint similar to that of the case A, or may be required from the viewpoint that the details can be included that are not known by the executive authority person.

Again, in a case C where "the authority persons and the issuers partly overlap," it is also possible to optionally set up the inquiry of output as either of needed/unneeded depending on the viewpoint. The case C corresponds to a case where the print job is sent to a plurality of users in the case B. The case C may be further divided depending on a relation of between the executive authority persons and the issuers. When the executive authority is included in the issuers as an executive authority A, it is possible to consider according to the case B. When the executive authority is not included in the issuers as an executive authority B, it is possible to consider according to the case D.

According to the process of the forth embodiment described above, switching the inquiry of whether or not to output enables the printing to be performed with simple operations and thereby enabling a convenience of the print system to be enhanced. Although exemplified in the fourth embodiment is the case where the need or not for the inquiry is switched based on the identity of the issuer and the executive authority person of the print job, the switching may be performed based on details of the print job. For example, the need or not for the inquiry may be switched based on the levels exemplified in step S12 of FIG. 8. Alternatively, when the fee is charged for the printing, the need or not may be switched based on the fee. For example, the inquiry of whether or not to output may be performed for the job for which a predetermined fee or above is charged such as the print job including a color photo while the inquiry may be omitted when the fee is below the predetermined fee.

The inquiry of whether or not to output may be replaced with the need or not for the authentication. For example, when inquiring about whether or not to output (step S26) in the process of FIG. 9, the authentication information may be required to be input instead of YES/NO. This enables the input of authentication information and the inquiry of whether or not to output to be performed at the same time, and thereby enabling the operation to be simplified.

The process of FIG. 9 is applicable even if the personal authentication is omitted in the first and second embodiments (FIG. 3 and FIG. 7).

E. Modifications

In the first embodiment, there is exemplified the print process for the case where the list of the jobs corresponding to the user is presented, the send job is selected and then the personal authentication is performed (FIG. 3). In the second embodiment, there is exemplified the process for the case where the personal authentication is performed and then the list of the jobs corresponding to the user is presented (FIG. 7). The both processes can be replaced one another, and therefore the process of the second embodiment (FIG. 7) may be applied to the configuration of the first embodiment while the process of the first embodiment (FIG. 3) may be applied to the configuration of the second embodiment.

Although the print job is selected in the first and second embodiments, this process may be omitted to send all the jobs corresponding to the executive authority person. This enables the operation to be simplified, and thereby enabling a convenience to be enhanced.

In the first and second embodiments, there is exemplified the case where the voiceprint or fingerprint is used for the personal authentication. Using these biometric authentications advantageously enable the personal authentication to be performed with high accuracy. Meanwhile, the biometric authentication may include a shape of face or palm, an iris of eye, handwriting and the like. In these embodiments, it is optional to apply the biometric authentication, and thus the password authentication may be applied.

Although various embodiments of the invention have been described, it should be noted that the invention is not limited to these embodiments and may include various configurations without departing from the spirit of the invention. For example, the control processes described above may be implemented by software or hardware.

INDUSTRIAL APPLICABILITY

This invention can be used for outputting a print job via a network.

What is claimed is:

1. A print intermediary server provided on a network which sends a print job received via the network to a printing apparatus connected to the network, the print intermediary server comprising:
    a job management unit that manages the print job associated with an output authority person who has output authority of the print job;
    an instruction acquisition unit that acquires from a sender, via at least one client connected to the network, an output instruction of the print job and authentication information for authenticating the sender of the output instruction; and
    a print job output unit, when the sender is authenticated to have the output authority based on the authentication information, sends the print job to the printing apparatus.

2. A print intermediary server according to claim 1, wherein the at least one client is an apparatus that differs from the printing apparatus.

3. A print intermediary server according to claim 2,
    wherein a plurality of printing apparatuses are connected to the network,
    the instruction acquisition unit further acquires designation information for designating one of the printing apparatuses to which the print job should be output, and
    the print job output unit sends the print job based on the designation information.

4. The print intermediary server according to claim 1, wherein the at least one client is configured in an integral fashion with the printing apparatus.

5. A print intermediary server according to claim 1, wherein the authentication is performed based on whether or not a particular information previously associated with the output authority person is identical to the input authentication information.

6. A print intermediary server according to claim 1, wherein the authentication is performed based on whether or not a user identified based on the authentication information is identical to the output authority person.

7. A print intermediary server according to claim 1, wherein the print job output unit switches a plurality of authentication methods in response to at least one of details of the print job and a issuer of the print job.

8. A print intermediary server according to claim 1, wherein the print job output unit performs the authentication for each print job to be output.

9. A print intermediary server according to claim 1, wherein the authentication is performed by means of a biometric authentication.

10. A print intermediary server provided on a network which sends a print job received via the network to a printing apparatus connected to the network, the print intermediary server comprising:
    a job management unit for managing the print job in associated with an output authority person who has output authority of the print job;
    an instruction acquisition unit for acquiring from one of clients connected to the network an output instruction of the print job and authentication information for authenticating a sender of the output instruction; and
    a print job output unit, when the sender is authenticated to have the output authority based on the authentication information, sends the print job to the printing apparatus,
    wherein the print job output unit switches authentication information to be input via the client in response to a timing of the output instruction.

11. A print intermediary server provided on a network which sends a print job received via the network to a printing apparatus connected to the network, the print intermediary server comprising:
    a job receiving unit that receives the print job associated with at least one executive authority person for authorizing an output of the print job and at least one issuer of the print job; and
    an output control unit that switches an executive procedure and then sends the print job based on at least one of details of the print job and an identity of the at least one executive authority person and the at least one issuer, wherein said at least one executive authority person and said at least one issuer are different persons.

12. The print intermediary server according to claim 11, wherein the output control unit, when the at least one executive authority person and the at least one issuer at least partly overlap, can send the print job without inquiring the at least one executive authority person about whether or not to send the print job.

13. A print intermediary server provided on a network which sends a print job received via the network to a printing apparatus connected to the network, the print intermediary server comprising:

a job receiving unit for receiving the print job in associated with an executive authority person of output of the print job and an issuer of the print job; and an output control unit for switching an executive procedure and then sending the print job in response to at least one of details of the print job and an identity of the executive authority person and the issuer, wherein the output control unit, when a person other than the executive authority person is included in the issuers, inquires the executive authority person about whether or not to send the print job and then can send the print job based on the result.

14. An intermediary method of using a print intermediary server provided on a network to send a print job received via the network to a printing apparatus connected to the network, the intermediary method comprising:

(a) managing the print job associated with an output authority person who has output authority of the print job in the print intermediary server;

(b) acquiring, from at least one of client connected to the network, an output instruction of the print job and authentication information for authenticating a sender of the output instruction; and (c) sending the print job to the printing apparatus when the sender is authenticated to have the output authority based on the authentication information.

15. An intermediary method of using a print intermediary server provided on a network to send a print job received via the network to a printing apparatus connected to the network, the intermediary method comprising:

(a) receiving the print job associated with an executive authority person authorizing output of the print job and an issuer of the print job; and (b) switching an executive procedure and then sending the print job based on whether or not the executive authority person is identical to the issuer.

16. A computer readable recording medium storing a computer program for performing a method of using a print intermediary server provided on a network to send a print job received, from a device connected to the network to a printing apparatus connected to the network, the method comprising:

managing the print job associated with an output authority person who has output authority of the print job in the print intermediary server;

acquiring from a sender, via at least one client connected to the network, an output instruction of the print job and authentication information for authenticating a sender of the output instruction; and sending the print job to the printing apparatus based on the output instruction when the sender is authenticated to have the output authority based on the authentication information.

17. A computer readable recording medium storing a computer program for performing a method of using a print intermediary server provided on a network to send a print job received via the network to a printing apparatus connected to the network, the method comprising:

receiving the print job in associated with an executive authority person of output of the print job and an issuer of the print job; and switching an executive procedure and then sending the print job based on whether or not the executive authority person is identical to the issuer.

18. The print intermediary server according to claim 1, wherein the print intermediary server receives the print job from a device connected to the network, and wherein said at least one client is different from the device.

19. The print intermediary server according to claim 1, wherein said at least one device comprises at least a wireless communication device.

20. A print intermediary server provided on a network which sends a print job received via the network to a printing apparatus connected to the network, the print intermediary server comprising:

a job management unit for managing the print job associated with an output authority person who has output authority of the print job;

an instruction acquisition unit for acquiring from a sender, via at least one client connected to the network, an output instruction of the print job and authentication information for authenticating the sender of the output instruction; and a print job output unit, when the sender is authenticated to have the output authority based on the authentication information, sends the print job to the printing apparatus.

21. A print intermediary server provided on a network which sends a print job received via the network to a printing apparatus connected to the network, the print intermediary server comprising:

a job receiving unit for receiving the print job associated with at least one executive authority person for authorizing output of the print job and at least one issuer of the print job; and an output control unit for switching an executive procedure and then sending the print job based on at least one of details of the print job and an identity of the at least one executive authority person and the at least one issuer, wherein said executive authority person and said at least one issuer are different persons.

22. A print intermediary server provided on a network which sends a print job received via the network to a printing apparatus connected to the network, the print intermediary server comprising:

a memory;

a control circuit, said control circuit managing the print job associated with an output authority person who has output authority of the print job and acquiring from a sender, via at least one client connected to the network, an output instruction of the print job and authentication information for authenticating the sender of the output instruction, and when the sender is authenticated as having the output authority based on the authentication information, the print job is sent to the printing apparatus.

23. A print intermediary server provided on a network which sends a print job received via the network to a printing apparatus connected to the network, the print intermediary server comprising:

a memory;

a control circuit, said control circuit switching an executive procedure and then sending a print job associated with at least one executive authority person for authorizing an output of the print job and at least one issuer of the print job, based on at least one of details of the print job and an identity of the at least one executive authority person and the at least one issuer, wherein said at least one executive authority person and said at least one issuer are different persons.

* * * * *